(12) United States Patent
Andre et al.

(10) Patent No.: US 10,508,031 B2
(45) Date of Patent: Dec. 17, 2019

(54) CHLORINE DIOXIDE GENERATION

(71) Applicant: INTERNATIONAL DIOXCIDE, INC., North Kingstown, RI (US)

(72) Inventors: Neil Andre, Warwick, RI (US); Aimee E. Belisle, Moosup, CT (US); Randy D. Belisle, Moosup, CT (US); William J. Hulsman, Warwick, RI (US)

(73) Assignee: International Dioxcide, Inc., North Kingstown, RI (US)

( * ) Notice: Subject to any disclaimer, the term of this patent is extended or adjusted under 35 U.S.C. 154(b) by 36 days.

(21) Appl. No.: 15/858,002

(22) Filed: Dec. 29, 2017

(65) Prior Publication Data
US 2018/0186635 A1  Jul. 5, 2018

Related U.S. Application Data

(60) Provisional application No. 62/606,151, filed on Dec. 30, 2016.

(51) Int. Cl.
*C01B 11/02* (2006.01)
*B01J 19/00* (2006.01)
(Continued)

(52) U.S. Cl.
CPC .............. *C01B 11/024* (2013.01); *B01J 7/02* (2013.01); *B01J 14/00* (2013.01); *B01J 19/002* (2013.01);
(Continued)

(58) Field of Classification Search
CPC ...... B01J 19/002; B01J 19/24; B01J 19/0073; B01J 19/006; B01J 7/02; B01J 14/00;
(Continued)

(56) References Cited

U.S. PATENT DOCUMENTS 3,998,714 A    12/1976   Armstrong
4,019,983 A     4/1977   Mandt
(Continued)

FOREIGN PATENT DOCUMENTS

CA    1072725 A    3/1980
CA    1082819 A    7/1980
(Continued)

OTHER PUBLICATIONS

Zhang, J., Dai, L., & Tan, W. (2012). Study of manufacturing high pure chlorine dioxide with multi-stage compound chlorine dioxide generator. Advanced Materials Research, 550-553(4), 3125-30. doi:http://dx.doi.org/10.4028/www.scientific.net/ AMR.550-553.3125.
(Continued)

*Primary Examiner* — Lessanework Seifu
(74) *Attorney, Agent, or Firm* — Haukaas Fortius PLLC; Michael Haukaas

(57) ABSTRACT

Devices and methods for safely using acid/chlorite $ClO_2$ generator chemistry for water treatment, whereby a valve prevents chemical draw unless there is both vacuum within the reaction chamber as well as suitable water volume in the flow chamber for dilution, are described. The float-dependent valve can also allow for direct venting from the reaction chamber to the flow chamber in the event of elevated pressure in the reaction chamber. This approach delivers an inherently safer $ClO_2$ generator design for systems that utilize high strength reactor zones with $ClO_2$ concentration above 3,000 ppm.

14 Claims, 2 Drawing Sheets

(51) Int. Cl.
*B01J 14/00* (2006.01)
*B01J 7/02* (2006.01)

(52) U.S. Cl.
CPC ......... *B01J 19/006* (2013.01); *B01J 19/0073* (2013.01); *C01B 11/022* (2013.01); *B01J 2219/0027* (2013.01); *B01J 2219/00182* (2013.01); *B01J 2219/00763* (2013.01); *B01J 2219/24* (2013.01)

(58) Field of Classification Search
CPC ...... B01J 2219/00182; B01J 2219/0027; B01J 2219/00763; B01J 2219/24; C01B 11/024; C01B 11/023; C01B 11/022
See application file for complete search history.

(56) References Cited

U.S. PATENT DOCUMENTS

| | | |
|---|---|---|
| 4,035,296 A | 7/1977 | Armstrong |
| 4,035,301 A | 7/1977 | Armstrong |
| 4,045,347 A | 8/1977 | Armstrong |
| 4,119,273 A | 10/1978 | Armstrong |
| 4,202,371 A | 5/1980 | Armstrong |
| 4,269,419 A | 5/1981 | Brant |
| 4,886,653 A | 12/1989 | Gasper et al. |
| 5,192,007 A | 3/1993 | Blomquist |
| 5,462,100 A | 10/1995 | Covert et al. |
| 5,803,319 A | 9/1998 | Smith et al. |
| 6,274,009 B1 | 8/2001 | Krafton et al. |
| 7,128,879 B1 | 10/2006 | Hunt et al. |
| 8,663,481 B2 | 3/2014 | Duve |
| 2002/0061263 A1 | 5/2002 | Taylor |
| 2005/0079122 A1 | 4/2005 | DiMascio |
| 2005/0079124 A1 | 4/2005 | Sanderson |
| 2009/0159538 A1 | 6/2009 | Duve |
| 2011/0220587 A1 | 9/2011 | Duve |
| 2012/0148477 A1 | 6/2012 | Rosenblatt et al. |

FOREIGN PATENT DOCUMENTS

| | | |
|---|---|---|
| CA | 1085521 A | 9/1980 |
| CA | 1088845 A | 11/1980 |
| DE | 202004005755 U1 | 7/2004 |
| JP | 2006089332 A | 4/2006 |
| JP | 2008094662 A | 4/2008 |
| WO | 2009077213 A1 | 6/2009 |
| WO | 2009077309 A1 | 6/2009 |
| WO | 2013053789 A1 | 4/2013 |

OTHER PUBLICATIONS

International Search Report and Written Opinion for PCT/US2017/068943 dated Mar. 7, 2018.

CHLORINE DIOXIDE GENERATION

CROSS-REFERENCE TO RELATED APPLICATIONS

This application is a continuation application claiming priority to and benefit of U.S. Non-Provisional application Ser. No. 15/394,885 filed Dec. 30, 2016, entitled "Chlorine Dioxide Generation," which is hereby incorporated herein by reference in its entirety. (A Petition to Convert the above referenced Serial No. to a provisional application is pending with the United States Patent and Trademark Office. In the event said Petition is granted, the priority claim will be corrected accordingly.)

BACKGROUND OF THE INVENTION

Chlorine dioxide ($ClO_2$) is a potent oxidizing agent that is commonly used as a water treatment disinfectant. In the vapor phase, gaseous $ClO_2$ ignites at concentrations greater than 10% by volume. Therefore, $ClO_2$ cannot be shipped and must be prepared on site. Aqueous solutions of $ClO_2$ generated at the point of use can be safely handled and applied as long as conditions that may lead to decomposition do not develop.

Chlorine dioxide is generally produced from sodium chlorite ($NaClO_2$) and an acid, usually hydrochloric acid (HCl), which can be expressed by the chemical equation:

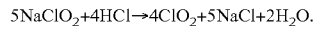

$$5NaClO_2 + 4HCl \rightarrow 4ClO_2 + 5NaCl + 2H_2O.$$

For most systems, about 80% of the sodium chlorite introduced into the generator is converted to $ClO_2$ in excess acid, which is required to drive the reaction to completion.

Conventional acid-chlorite ("AC") $ClO_2$ generators use pumps or an eductor to properly flow and mix reactants in a preliminary reaction chamber. The generated $ClO_2$ is diluted at the outlet motive water stream for either short-term storage or direct process application. Eductor-based systems provide safe operation because the reactor is under vacuum while $ClO_2$ is generated. The combined vacuum and flow dynamics of the eductor prevent explosive levels of $ClO_2$ vapor from forming by rapidly diluting $ClO_2$ into the motive water supply. A high concentration of $ClO_2$ is therefore not allowed to develop and persist in the reaction zone at elevated pressure. The motive water driving the eductor operation also promotes immediate $ClO_2$ dilution, which prevents high concentrations of $ClO_2$ from persisting or accumulating. In some embodiments, the motive water supply may be cycled between an "on" state and an "off" state to control $ClO_2$ administration. Automated valves on each of the reactant precursor feed lines close to halt reactor operation when suitable motive water flow is not provided or process water flow is not detected.

Standard eductor operations require enough motive water flow to provide the appropriate suction force for the chemical feeds, and safe operational guidelines limit the final stream $ClO_2$ concentration to no greater than 3,000 ppm. However, $ClO_2$ concentration in the AC reaction chamber can greatly exceed this value, especially when acid is fed near stoichiometric ratio to chlorite and the reactor is not purged when the system is turned off. Higher reactant precursor concentrations will also elevate the hazards associated with these reactors; therefore, 7.5% sodium chlorite is typically paired with 10-15% HCl solution for these systems. Larger $ClO_2$ generation capacity requires proportionately larger reaction chamber volumes, leading to increased operational hazards. Thus, AC systems are generally limited to lower production levels, such as 50 lb/day $ClO_2$ or lower.

While the AC generator chemistry is commonly used in the industry and has many system design variations (see U.S. Pat. Nos. 7,128,879; 4,886,653; US 2002/0061263; and JP 2006 089332), most designs simply pump or educt the precursor chemical feeds into an isolated reaction chamber that then supplies the $ClO_2$ product to an application point. In some cases, the reaction chamber is situated fully or partially within the process flow stream, but these systems often do not have mechanisms to prevent $ClO_2$ generation in the event of low to no process flow, or to respond to a high-pressure event in the reaction chamber. Due to the desire for low-cost systems, the AC generator systems generally have minimal safety interlocks and limited $ClO_2$ generation capacity.

U.S. Pat. No. 7,128,879 has incorporated float-dependent valve controls into the operation of a $ClO_2$-generating system. These float sensors or float-dependent valves are used to dispense proper amounts of water and/or $ClO_2$ chemical in response to levels detected in a basin or reservoir. While these float sensors may offer a way to ensure there is a proper amount of dilution water before chemical addition and preventing overflow of a basin, there is no safety mechanism attributed to the reaction chamber itself, which is where destructive failures can be the most severe due to the presence of high concentration of $ClO_2$. U.S. Pat. No. 7,128,879 also pertains to treatment of a basin whereas the present invention seeks to treat an active process water supply line.

INVENTION SUMMARY

The $ClO_2$ generator design combined with the utility of a float-dependent valve described herein is novel and has not been previously. Additionally, the inverted orientation of the floating ball check valve versus how it is typically deployed is non-obvious and is a unique approach to a novel reactor design. Instead of serving as a check valve, it is a safety relief valve during normal operations whereby it remains closed during normal operation but will open in case of elevated pressure in the reaction chamber. Also, it serves as a safety interlock during start-up by ensuring proper dilution water is present in the flow chamber before chemical production initiates. The float-dependent valve, being an isolated mechanical device, does not require any wiring or connection to secondary equipment or sensors to perform these functions. The float-dependent check valve will only close and allow chemical flows to commence when there is both a proper amount of dilution water in the flow chamber and a vacuum is being pulled over the reaction chamber. There is no other $ClO_2$ generator that has been designed with such a simple and elegant safety interlock that serves to facilitate safe $ClO_2$ generation despite utilizing reactor zones that contain higher than 3,000 ppm $ClO_2$.

Various embodiments of the invention are directed to an AC generator device and methods for using the device to provide in-line $ClO_2$ generation for water treatment. FIG. 1 and FIG. 2 illustrate embodiments of a device 1, including a reaction chamber 10. During operation, the reaction chamber 10 may be held under vacuum. An acid feed 102, a chlorite feed 104, and a motive water conduit 108 may open into the reaction chamber 10 to provide the reactants for production of $ClO_2$. The acid feed 102 and the chlorite feed 104 may be mixed in the reaction chamber 10. An eductor 110 may be attached to the reaction chamber 10 and open into a flow chamber 16 to introduce $ClO_2$ produced in the reaction chamber 10 into treatment water passing through the flow chamber 16. In certain embodiments, the reaction chamber 10 and eductor 110 may be substantially submerged during production of $ClO_2$ by water from the flow chamber 16, and in particular embodiments, the reaction chamber 10 and eductor 108 may be completely submerged in water from the flow chamber 16. In some embodiments, the reaction chamber 10 may comprise a material such as, for example, a baffling material or a packing material. In some embodiments, such a material may promote sufficient mixing and residence time to maximize conversion efficiency to $ClO_2$.

The eductor 110 may be connected to the reaction chamber 10 to allow water flowing through the motive water conduit 108 to create a vacuum in the reaction chamber 10. In some embodiments, the device may further include a valve 18 that provides a second connection between the reaction chamber 10 and flow chamber 16 and open to the flow chamber 16 to relieve excess pressure during operation of the device 1.

In particular embodiments, the valve 18 may respond to fluid levels in the flow chamber 16, closing the valve and sealing the reaction chamber 10 only when the fluid level is sufficiently high to produce $ClO_2$ safely. When fluid level is sufficiently high, the flow chamber 16 holds enough liquid to safely dilute the entire contents of the reaction chamber 10 to a $ClO_2$ concentration below 3,000 ppm, in the case of reaction chamber 10 contents draining entirely into the flow chamber 16 during low or non-flow condition. In some embodiments, the fluid may be water. In certain embodiments, the check valve 18 may act as an emergency vent if excessive pressure is built up in the reaction chamber 10 by opening to the flow chamber 16, allowing reactor contents to empty into the flow chamber 16 and be safely contained. In some embodiments, the reaction chamber 10 may be configured to separate from the device and release its contents if a high-pressure event occurs that is beyond the venting capability of the valve 18.

Such water level responsive valves may be configured in any way. For example, in some embodiments as pictured in FIG. 1, the valve 18 may be a floating ball check valve. A floating ball within the check valve 18 may close when the flow chamber 16 is sufficiently filled with water and motive water is supplied, thereby sealing the reaction chamber 10 and allowing the motive water conduit 108 to produce a vacuum that initiates draw of chemicals and $ClO_2$ generation. In other embodiments, the valve 18 may be actuated by a water level sensor located in the flow chamber (not depicted). In such embodiments, the valve may be located on any surface of the reaction chamber. In some embodiments, the valve may comprise one or more of a check valve, a ball check valve, a gasket, a flexible gasket, or combinations thereof. In such embodiments, the gasket may be a flexible gasket to allow the release of contents into the flow chamber.

The reaction chamber may be connected directly to a treatment water flow as illustrated in FIG. 1, having a treatment water flow inlet 130 and a treatment water flow outlet 133. In such embodiments, the $ClO_2$ produced in the reaction chamber 10 is introduced into the treatment water flow directly. In other embodiments, the reaction chamber 10 may be an accessory to the main treatment water flow. For example, the reaction chamber 10 may be fluidly connected to a treatment water main such that a portion of the water flowing through the main is transported to the reaction chamber 10. The $ClO_2$ produced in the reaction chamber 10 may be diluted, and then transported through an outlet into the treatment water main where the diluted $ClO_2$ treats the treatment water.

In some embodiments, a device as described herein may further include one or more control systems. Such control systems may be configured to automate the chemical feed rate of $ClO_2$ and may employ sensors sensitive to, for example, ORP, pH, and/or $ClO_2$ concentration or other sensors. In some embodiments, a control sensor may be used to turn the device, or a system therein, "on" or "off" as necessary. In addition, in some embodiments one or more flow rate control valves may be used on the treatment water flow inlet line and/or the treatment water flow outlet line to allow for variable control of a $ClO_2$ feed rate into the process stream being treated.

In some embodiments, the components and chambers described herein may be modular in nature, such that they may be individually removed, repaired, or replaced. In additional embodiments, the device described herein may comprise one or more of each of the components and chambers. In other embodiments, the range and flow of $ClO_2$ production may be modified by changing the eductor, increasing or decreasing the treatment and water flow inlet and outlet, and any other modification apparent to one of skill in the art.

The device of embodiments described above provides enhanced safety features. For example, submerging the reaction chamber 10 and eductor 110 in treatment water insulates the reaction chamber 10. A vertically oriented reactor assembly allows an inverted floating ball check valve 18 to prevent chemical eduction when the flow chamber is insufficiently flooded to safely dilute the generated $ClO_2$. Thus, unless there is sufficient process water in the flow chamber to close the ball check valve 18, the eductor 110 will not hold a vacuum and would not draw precursor chemicals to make $ClO_2$. Incorporating the eductor flow into the main process flow ensures that $ClO_2$ generation will only take place when there is also suitable dilution process water for the operation. This prevents potential $ClO_2$ accumulation or dead-heading in a closed-loop system. Additionally, eduction prevents pressurization of any potential $ClO_2$ gas in the reaction zone and avoids the use of pumps for precursor chemical feeds. Further, immediate $ClO_2$ dilution after exiting the reaction chamber into the water flow minimizes the risks of concentrated $ClO_2$ exposure. Moreover, a compact design facilitates maintenance, repairs, and overall operation of the device disclosed herein.

Further embodiments are directed to methods for treating water with $ClO_2$. Such methods may include inducing a vacuum when flow chamber 16 water level reaches the height of the valve 18 and producing $ClO_2$ under the vacuum. In some embodiments, the step of inducing a vacuum may be carried out by closing a check valve between a flow chamber and a reaction chamber and producing a vacuum in the reaction chamber. Closing a check valve can be carried out by any mechanism. For example, a mechanical or electronic valve that is configured to close upon contact of the valve or a sensor with water can be used. In other embodiments, the valve 18 can include a float that seals an orifice in the reaction chamber when the treatment water level reaches the reaction chamber. In some embodiments, the seal formed by the check valve may become progressively tighter as an increasing vacuum is applied to or produced by the reaction chamber. Producing a vacuum in the reaction chamber can be carried out by any mechanism. For example, producing a vacuum can be carried out using a pump, and in certain embodiments, producing a vacuum can be carried out by Venturi effect, using the motive force of water entering the reaction chamber.

Producing $ClO_2$ can be carried out in a variety of ways. FIG. 2 gives a larger view of the primary components of this invention. The reaction chamber 10 must be designed to appropriately mix the reactant chemical streams and hold for sufficient residence time in order to optimize conversion to $ClO_2$. In some embodiments, the method may include filling at least a portion of the reaction chamber with water while also drawing reactants into the reaction chamber. The step of filling at least a portion of the reaction chamber can be carried out by transporting a portion of the treatment water to the reaction chamber, and in some embodiments, the water used for filling at least a portion of the reaction chamber may include the water used to produce a vacuum by Venturi effect. The step of drawing reactants into the reaction chamber can be carried out as a result of inducing a vacuum. In various embodiments, the reactants may include, for example, sodium chlorite ($NaClO_2$) and hydrochloric acid (HCl).

The method may further include combining the reactants with water to produce $ClO_2$. In some embodiments, combining the reactants with water can be carried out innately upon filling at least a portion of the reaction chamber with water and drawing reactants into the reaction chamber. In other embodiments, the reaction chamber may include a mixing device, such as a mechanical stirrer or water jets. The reaction chamber may also contain packing material, baffles, serpentine channels and/or other means to promote suitable reactant mixing and adequate residence time in the reaction chamber before dilution into the motive water supply.

After producing $ClO_2$, the method of various embodiments may include transporting the $ClO_2$ to the treatment water. In some embodiments, the transporting can be carried out by pumping the $ClO_2$-containing water from the reaction chamber to the treatment water. In other embodiments, transporting can be carried out by siphoning $ClO_2$-containing water into treatment water through an eductor immersed in the treatment water.

DETAILED DESCRIPTION

Figure 1:
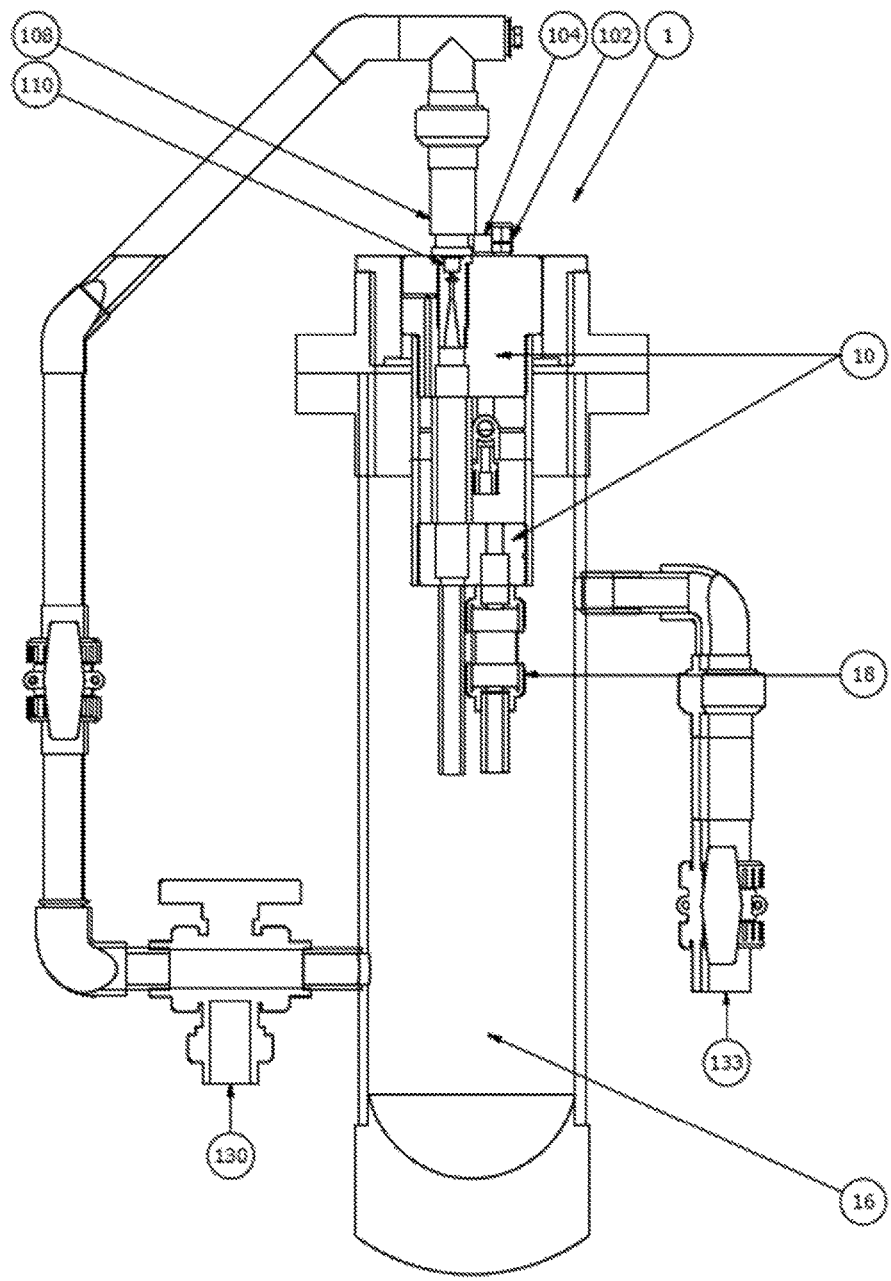
FIG. 1 shows a schematic for a two-part reactor assembly with a reaction chamber upstream of the eductor.
Figure 2:
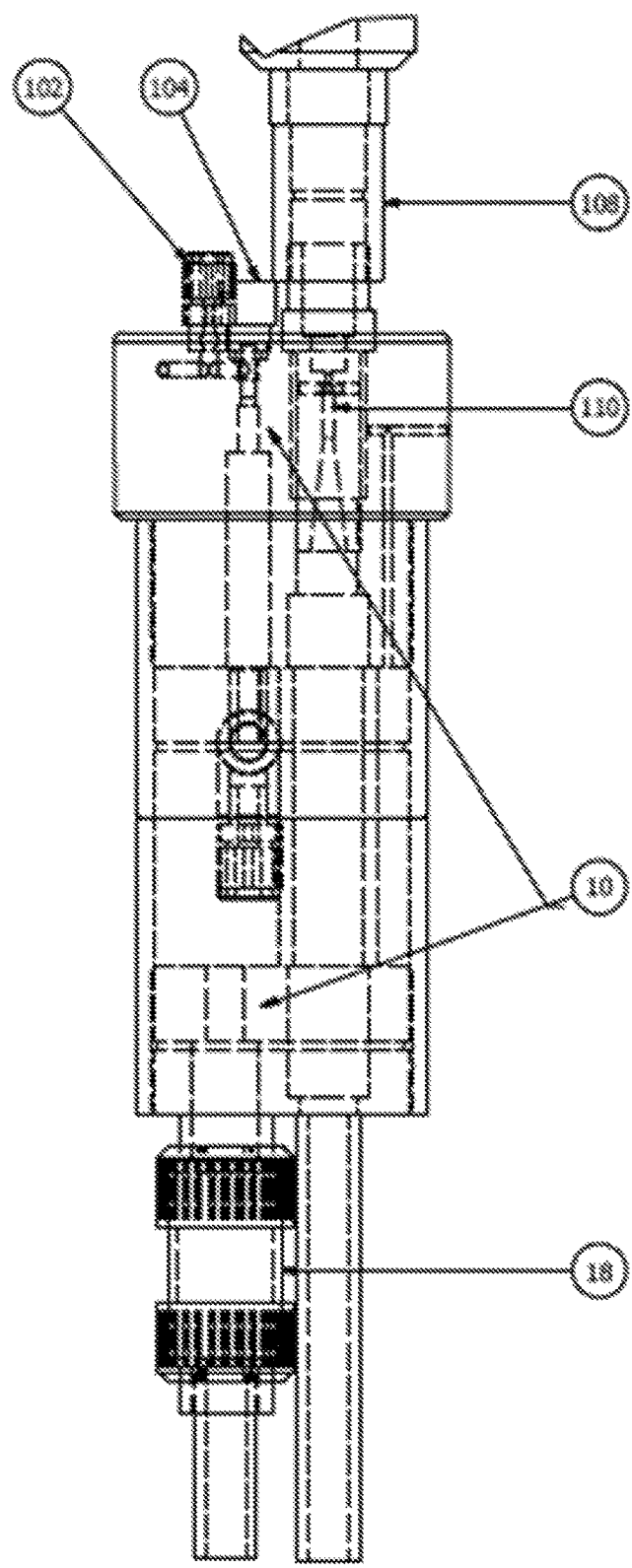
FIG. 2 shows a detailed view of the eductor and reactant feed lines that reside at the top of the reaction chamber in accordance with the present disclosure.

The above summary of the present invention is not intended to describe each illustrated embodiment or every possible implementation of the present invention. The detailed description, which follows, particularly exemplifies these embodiments.

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope, which will be limited only by the appended claims.

It must be noted that as used herein and in the appended claims, the singular forms "a", "an", and "the" include plural reference unless the context clearly dictates otherwise. Unless defined otherwise, all technical and scientific terms used herein have the same meanings as commonly understood by one of ordinary skill in the art. Although any methods and materials similar or equivalent to those described herein can be used in the practice or testing of embodiments disclosed, the preferred methods, devices, and materials are now described.

As used herein, the term "chlorine dioxide" ($ClO_2$) means a chemical used as a broad-spectrum biocide and selective oxidizer that has a broad range of utility in water treatment. Due to its instability at high concentration, it is typically produced on site from precursor chemicals and immediately diluted into the process water supply being treated.

As used herein, the term "floating ball check valve" means a check valve that uses a ball as the internal component that seals against the valve body to stop flow and in which the ball has a density lower than the fluid medium being processed such that the ball floats.

As used herein, the term "flow chamber" means a vessel that either fully or partially surrounds the reaction chamber and through which a bulk of the process water being treated flows. It is sized to allow for adequate dilution of the reaction chamber, such that in a non-flow condition, complete emptying of the reaction chamber contents into the flow chamber would render a $ClO_2$ concentration no higher than 3,000 ppm.

As used herein, the term "reaction chamber" means a vessel in which precursor chemicals are combined to generate $ClO_2$.

EXAMPLES

Using 7.5 wt % $NaClO_2$ and 15 wt % HCl precursor solutions, maximum and minimum $ClO_2$ production flows were determined according to inlet pressure, outlet pressure, motive water flow rate, and process water flow. The system hardware was fixed although manual flow rate control valves were used for the precursors to vary the PPD $ClO_2$ generated. The system achieved 6-36 PPD $ClO_2$ production rates. After verifying acceptable conversion efficiency in the system, several scenarios were tested to validate the safety features of the device, as further described below.

Example 1: Process Flow Interruption

After the device had produced $ClO_2$ for 30 minutes, the process water was turned off to simulate a system that was shut down before it had time to be purged or emptied. With the process flow supply interrupted, the flow to the eductor was also interrupted, and the vacuum on the reaction chamber halted. At this point, the float-dependent valve 18 opened and allowed the contents of the reaction chamber to slowly drain into the flow chamber. This safety measure minimizes the risk of $ClO_2$ vapors building up in an enclosed reaction chamber volume.

Example 2: Low Acid Flow and Extended Dwell Time

In a more extreme set of circumstances, the acid feed was lowered to simulate a system that had not been properly configured to correct precursor feed ratios. When the acid feed is low, the $ClO_2$ concentration within the reaction chamber can be considerably higher if there is sufficient dwell time to convert the chlorite to $ClO_2$. In a shutdown scenario, the $ClO_2$ can continue to form over time after shutdown. Under these conditions, the float-dependent valve 18 sufficiently drained and diluted the reaction chamber 10 contents into the flow chamber 16 before any decomposition events occurred.

Example 3: Pressure Event Within the Reaction Chamber

A test was conducted in which water was forced through the acid feed at a rate of 310 gallons per day (GPD) while the pressure of the reaction chamber was monitored. With the float-dependent valve 18 in place, the maximum pressure achieved in the flow chamber was 1.2 psig. The check valve was then replaced by a plug to prevent venting, and the test was repeated. Applying the same flow rate of 310 GPD, the reaction chamber pressure increased to 4.4 psig, which is a nearly 4 times greater pressure differential between the reaction chamber 10 and the flow chamber 16. In these tests, the flow chamber 16 was being emptied to an open container, and did not have significant back pressure.

The iteration without the float-dependent valve 18 is similar to traditionally constructed AC $ClO_2$ generators, in which the reaction chamber consists of only two feed inlets and a single outlet being diluted into a process water supply. Therefore, in the case of a decomposition event within the reaction chamber 10, the modified design would readily release its contents into the process water flow, providing much quicker dilution and lower internal shock pressures as compared to a traditionally designed AC $ClO_2$ generator.

Example 4: Insufficiently Filled Flow Chamber

In this experiment, we attempted to start the $ClO_2$ generator without having sufficient fluid level in the flow chamber 16. In this case, no chemical flow occurred, because no vacuum could be maintained within the device. Without a sufficiently filled flow chamber 16, the float-dependent valve 18 did not seal and did not allow a vacuum to be established within the reaction chamber 10.

Example 5: Reaction Chamber Drainage

The float-dependent valve 18 also allows for faster and easier drainage when preparing the device or system for maintenance or inspection. Upon draining the flow chamber 16, the check valve float-dependent valve 18, flow out of the reaction chamber 10 would slow to a trickle, or may even require complete disassembly to empty its contents.

While the present disclosure has been illustrated by the description of exemplary embodiments thereof, and while the embodiments have been described in certain detail, it is not the intention of the Applicants to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

The invention claimed is:

1. A device comprising:
    (a) a reaction chamber wherein chemicals are mixed to generate chlorine dioxide;
    (b) an eductor that provides a vacuum within the reaction chamber and a motive water supply to deliver chlorine dioxide into a flow chamber;
    (c) the flow chamber operably connected to the reaction chamber via the motive water conduit; and
    (d) a float-dependent valve that provides a second connection between the reaction chamber and flow chamber and that serves as:
        i) a safety interlock that prevents chemical flow without having a sufficiently flooded flow chamber to dilute the generated chlorine dioxide, wherein the ratio of the flow chamber volume to the reaction chamber volume ensures chlorine dioxide concentration no higher than 3,000 ppm within the flow chamber;
        ii) a relief vent from the reaction chamber to the flow chamber should the reaction chamber experience a higher pressure than the flow chamber; and
        iii) a drainage component of the reaction chamber into the flow chamber in the absence of eductor-driven vacuum, thus preventing long-term storage of highly concentrated reactor liquor (>3,000 ppm chlorine dioxide) as well as facilitating reactor chamber maintenance or decommissioning.

2. The device of claim 1, wherein the float-dependent valve is an inverted, ball check valve and the ball component of this valve has a density lower than that of a process fluid yet has large enough mass to prevent closure of the valve under eductive vacuum alone.

3. The device of claim 1, wherein the float-dependent valve comprises a design in which a dynamic seating component of the check valve is a shape other than spherical yet its position, open or closed, is dependent upon floatation in the process fluid and vacuum in the reaction chamber.

4. The device of claim 1, wherein the float-dependent valve comprises a gasket.

5. The device of claim 4, wherein the gasket is a flexible gasket.

6. The device in claim 1, wherein an alkali metal chlorite is mixed with a mineral acid solution to generate chlorine dioxide.

7. The device in claim 1, wherein an alkali metal chlorate is mixed with a mineral acid solution to generate chlorine dioxide.

8. A device comprising:
    a reaction chamber having a first volume;
    an eductor;
    a flow chamber having a second volume, the flow chamber operably connected to the reaction chamber via a motive water conduit; and
    a float-dependent valve operably connected to the reaction chamber and the flow chamber; and
    wherein the float-dependent valve prevents chemical flow into the flow chamber if the flow chamber is not sufficiently flooded.

9. The device of claim 8, wherein the ratio of the second volume to the first volume is configured to prevent a concentration of chlorine dioxide from exceeding about 3,000 ppm.

10. The device of claim 8, wherein the float-dependent valve comprises an inverted ball check valve comprising a ball component.

11. The device of claim 10, wherein the ball component has a density lower than a process fluid density and a mass configured to prevent closure of the inverted ball check valve under eductive vacuum alone.

12. The device of claim 8, wherein the float-dependent valve comprises a dynamic seating component having a non-spherical shape, and wherein a position of the float-dependent valve depends upon floatation in a process fluid and a vacuum in the reaction chamber.

13. The device of claim 8, wherein the float-dependent valve comprises a gasket.

14. The device of claim 13, wherein the gasket is a flexible gasket.

* * * * *